United States Patent [19]

Kunesh et al.

[11] Patent Number: 4,820,455
[45] Date of Patent: Apr. 11, 1989

[54] APPARATUS FOR REDISTRIBUTION OF VAPOR AND LIQUID IN A PACKED COLUMN

[75] Inventors: John G. Kunesh, Burbank, Calif.; Frederik J. Zuiderweg, Bussum, Netherlands

[73] Assignee: Fractionation Research, Inc., South Pasadena, Calif.

[21] Appl. No.: 84,890

[22] Filed: Aug. 13, 1987

[51] Int. Cl.$^4$ .............................................. B01F 3/04
[52] U.S. Cl. ........................................ 261/96; 261/97; 261/113
[58] Field of Search ................ 261/96, 97, 113, 114.2, 261/114.3, 114.4; 202/158, 232; 422/220, 195; 55/90, 233; 239/556

[56] References Cited

U.S. PATENT DOCUMENTS

| | | | |
|---|---|---|---|
| 3,125,614 | 3/1964 | Mayfield et al. | 261/114.3 |
| 3,259,380 | 7/1966 | Brown | 422/195 X |
| 3,273,872 | 9/1966 | Eckert | 261/97 |
| 4,171,333 | 10/1979 | Moore | 261/113 X |
| 4,427,605 | 1/1984 | Meier et al. | 261/97 |
| 4,569,364 | 2/1986 | Keller et al. | 261/97 X |
| 4,669,890 | 6/1987 | Peyrot | 261/97 X |

FOREIGN PATENT DOCUMENTS 2145012  3/1985  United Kingdom ................ 261/113

OTHER PUBLICATIONS

Hoftyzer, *Transactions Of The Institution Of Chemical Engineers*, vol. 42, pp. T109–T117 (1964).
Ross, *Chemical Engineering Progress*, vol. 61, No. 10, pp. 77–82 (1965).
Perry, *Chemical Engineers' Handbook*, 6th ed., pp. 18-29 (1984).

*Primary Examiner*—Richard L. Chiesa
*Attorney, Agent, or Firm*—George J. Netter

[57] ABSTRACT

Redistribution devices in a packed column are provided for mixing and redistribution of both downflowing liquid and upflowing vapor to reduce liquid to vapor concentration gradients. In one form, the vapor is redistributed by first risers directing vapor streams outwardly toward the column and second risers located adjacent the column solely directing vapor streams toward the column center.

1 Claim, 2 Drawing Sheets

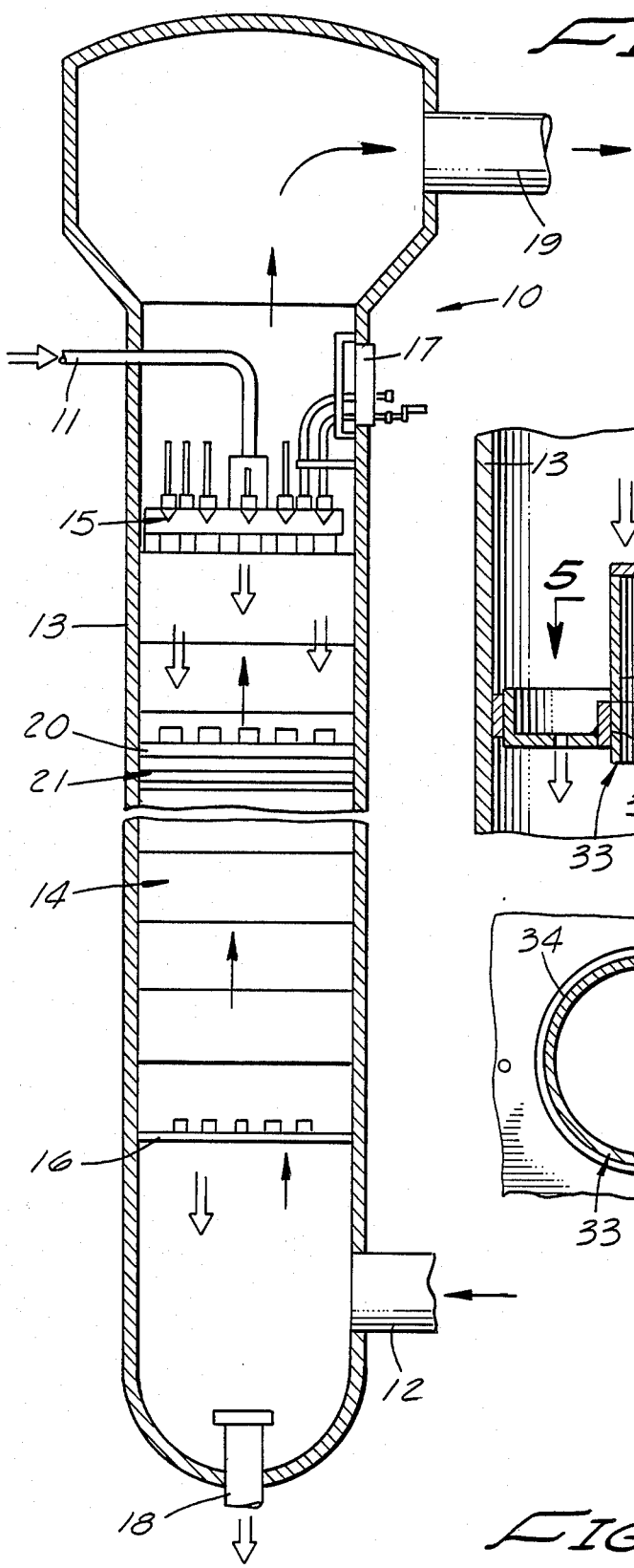
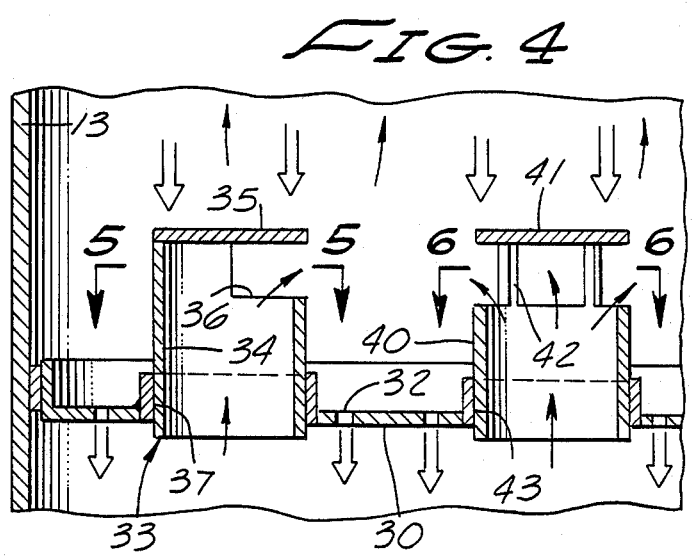
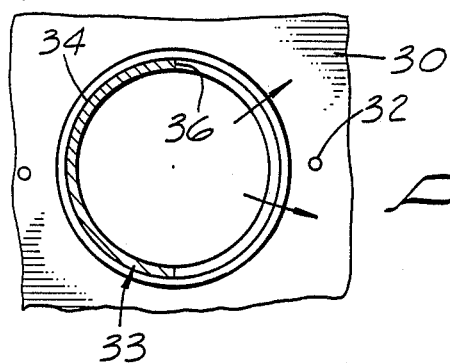
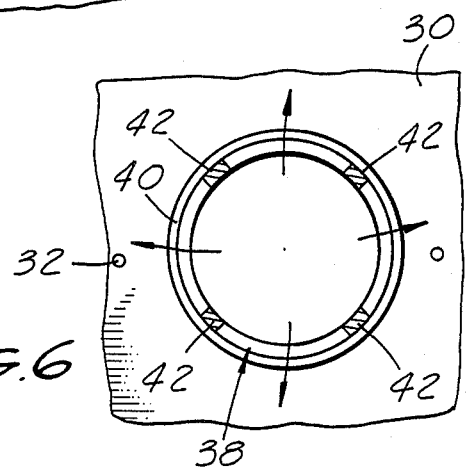
FIG. 1
FIG. 4
FIG. 5
FIG. 6

APPARATUS FOR REDISTRIBUTION OF VAPOR AND LIQUID IN A PACKED COLUMN

FIELD OF THE INVENTION

The present invention relates generally to the distribution and redistribution of liquid and vapor in a packed column and, more particularly, to such distribution and redistribution in order to substantially reduce the development of concentration gradients in both vapor and liquid phases of a packed column.

BACKGROUND OF THE INVENTION

There is a wide range of apparatus (e.g. scrubbing towers, fractionation towers, rectifying towers) in which liquid and vapors counterflow through interstices of packing material to establish a relatively large area of contact between the two resulting in desired mixing. As well as providing an extended surface area, the packing material also acts as a means for controlling the flow rate and thus the contact time of the liquid with the gas or vapor. Such equipment is typically arranged in vertical towers or columns in which a plurality of separate beds may be provided, each bed including packing material with the liquid moving downwardly for desired mixing with the counterflowing gas or vapor.

A persistent difficulty, especially where the column is of relatively large size, is that of maintaining a uniform flow of liquid, and to a lessor extent, vapor across the column cross-section. For example, there is a tendency for liquid to work to the outside of the tower and to flow downwardly along the column inner wall, leaving the packing central portions relatively untouched by the liquid. Liquid migrating to the tower wall in this way also results in additional pressure loss of the upwardly flowing vapor due to direct contact with the packing material. Both of these actions serve to reduce the contact efficiency between the liquids and vapors and thereby the column efficiency.

The prior art has recognized for some time the need for good liquid distribution in a packed column or tower. Note, for example, Hoftyzer, *Trans. Instn. Chem. Engrs.* v. 42,T109 (1964); and Ross, *Chem. Engr. Progress,* v. 61 10,77 (1965). More recently, with the development of better distributors and better packings the prevalent opinion, until conception of the present invention, has been that with careful attention to initial liquid distribution it is possible to design for packing beds of 25 to 30 feet between redistributors. *Chemical Engineers' Handbook*, 6th Edition, Sec. 18, page 29 (1984). However, the distribution and redistribution referred to is solely that of the liquid.

SUMMARY OF THE INVENTION

Heretofore, vapor remixing has been ignored because as long as the kinetic energy of the entering vapor is not too large relative to the pressure drop in the packed bed, the vapor will flow upwardly through the bed in a radially uniform manner. That is, there is no need to redistribute the vapor to achieve uniform mass flow. However, since no liquid distributor is perfect, and there is a tendancy for liquid to migrate toward the wall as it trickles downwardly through the bed, the liquid/vapor ratio will vary radially throughout the length of the bed. As a result, even though the liquid entering the top of the bed and the vapor entering the bottom have uniform compositions, the radial variation in liquid/vapor will generate radial concentration gradients in both the vapor and liquid phases. As the only driving force for the elimination of a vapor phase concentration gradient is molecular diffusion, an extremely slow process, mixing and redistribution of the liquid alone will only partially compensate for the apparent loss of efficiency caused by the radial concentration gradients described above. Consequently, in accordance with the present invention, redistribution devices provide for the mixing and redistribution of both downflowing liquid and the upflowing vapor.

While the present invention may be found advantageous for liquid and vapor distribution and redistribution in other environments, it is particularly adapted for application to packed column fractionation units, as shown in FIG. 1, where liquid moves downwardly in the column and is mixed with vapor moving upwardly through the same column. Moreover, packing devices used in such a column may either be of the random packing type or structured packing, the former being preferred primarily because of the ease with which it may be loaded into the column.

It is a primary aim and object of the present invention to provide an apparatus and method for effecting liquid and vapor redistribution in a column in order to substantially reduce liquid and vapor phase concentration gradients across the column.

A further object is to provide liquid and vapor redistribution devices following intermediate bed supports in packed columns which require the introduction of feedstreams or the necessity of supporting very long packing beds.

In accordance with the present invention, redistribution devices are provided for the mixing and redistribution of both downflowing liquid and the upflowing vapor. A preferred form of distributor, which is located under a bed support or intermediate feedpoint, includes a base plate having a large number of liquid drip points (i.e. openings) arranged substantially uniformly over its surface and enclosed by an outer peripheral wall. First vapor risers arranged in a closed path adjacent the outer peripheral wall include hollow tubular elements extending upwardly from the base plate with a covering wall over the upper end thereof preventing direct flow of downcoming liquid into the riser. Openings in the lateral wall of each first vapor riser face solely inwardly toward the center of the base plate.

A plurality of second vapor risers are mounted on the base plate in the central space defined by the first vapor risers. Each second vapor riser consists of tubular elements having an upper cover, as in the first described vapor risers, to prevent direct vertical flow of downcoming liquid into the riser. Openings are arranged about the tubular element such that upwardly moving vapor passes outwardly in a 360 degree angular dispersion. The combined effect of the vapor risers action is to produce a redistribution of the vapor which will smooth out and substantially reduce any vapor phase concentration gradients that may exist.

DESCRIPTION OF THE DRAWINGS

FIG. 1 depicts in schematical representation a typical packed column with which the present invention may be advantageously utilized.

FIG. 4 is a side elevational, sectional, partially fragmentary view taken along the line 4—4 of FIG. 3.

FIG. 5 is a top plan, sectional view through a first vapor riser of FIG. 4, taken along line 5—5 therein.

FIG. 6 is a top plan, sectional view taken along the line 6—6 of FIG. 4 through a second vaporizer.

DESCRIPTION OF A PREFERRED EMBODIMENT

Figure 2:
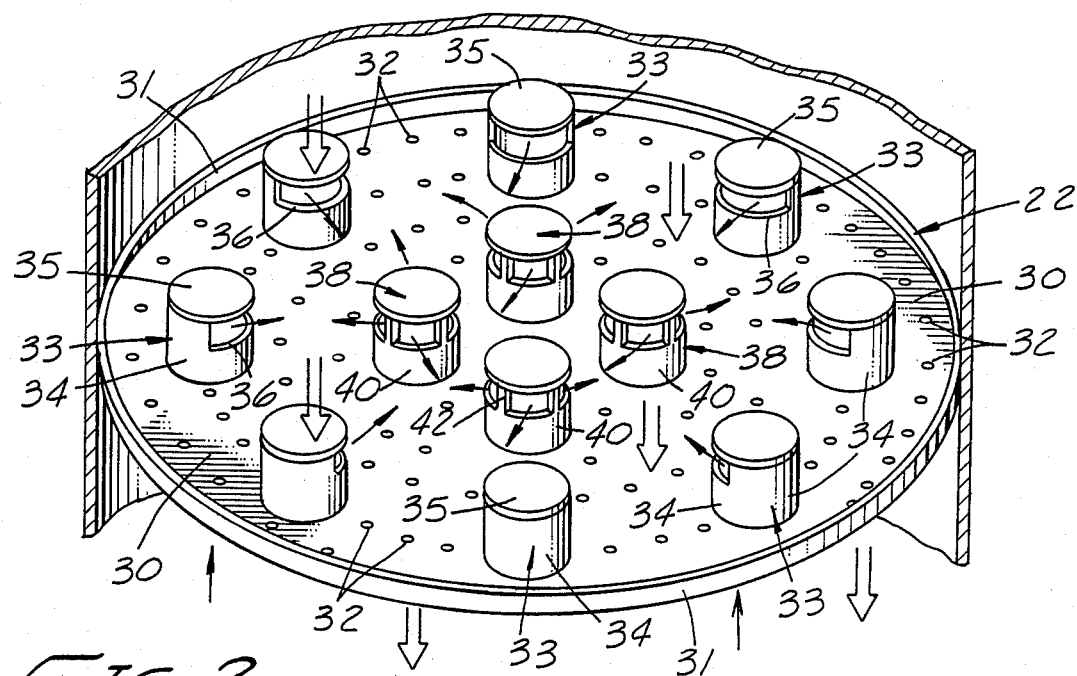
FIG. 2 is a sectional perspective view of a preferred form of redistributor for practicing the method of the present invention.
Figure 3:
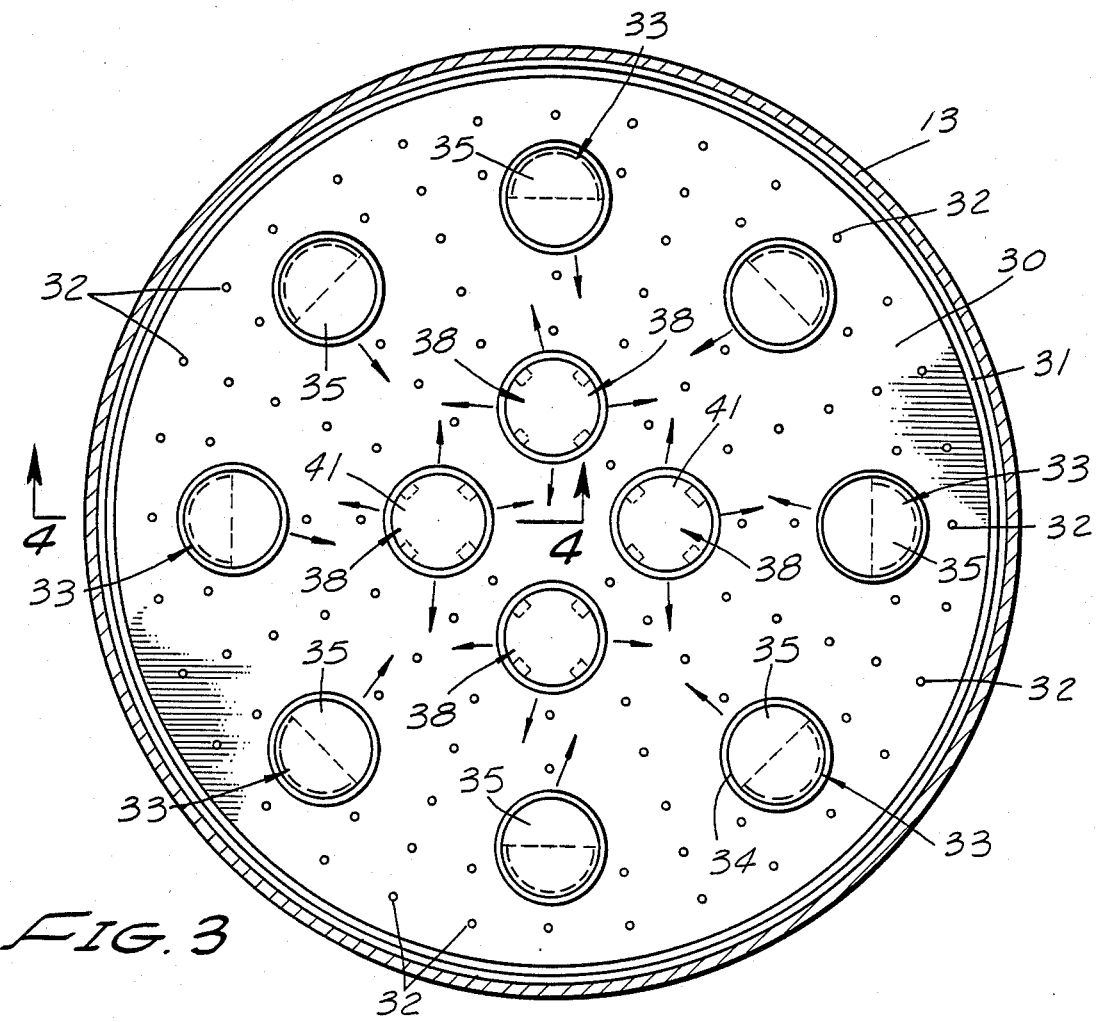
FIG. 3 is a top plan view of the redistributor of FIG. 2.

Turning now to the drawings, and particularly FIG. 1, there is shown in a sectional elevation a typical packed column unit 10 which is provided to illustrate one form of environment within which the method and apparatus of the present invention can be advantageously employed. The unit 10 has at its upper end a liquid inlet via which liquid is brought into the column and a vapor inlet 12 located adjacent the unit lower end. Intermediate the vapor and liquid inlets is a hollow, generally cylindrical column 13 within which a packing bed 14 is located including a plurality of packing elements (not shown) which may be any one of a number of known kinds. A liquid distribution assembly 15 is located above the packing bed 14 and acts in a way well known in the art to distribute incoming liquid from 11 uniformly over the packing bed upper surface. The lower end of the packing bed is maintained by a support plate 16, the edges of which are affixed in a suitable manner to the inner wall of column 13 and the center portion of which allows vapor and liquid to pass through. In the upper side wall of column 13 an access port 17 enables entry into the column in order to, for example, adjust the liquid distribution assembly. Although other types of liquid distribution assemblies known in the art may be used, one identified generally as a "drip pan" is satisfactory for present purposes.

As to general use and operation of the packed column unit 10, liquid entering at 11 makes its way downwardly of the column 13, through the liquid distribution assembly 15 and packing bed 14 to exit the column at 18. The gas or vapor entering at 12 rises passing through the support plate 16 and the packing bed 14, where it is mixed with the downcoming liquid, and finally exiting from the top of the column at 19. For ease of understanding, the path of the liquid is indicated by double line arrows and the vapor or gas travel is indicated by solid arrows.

A persistent problem in the operation of such columns has been the tendency for the liquid to migrate towards the wall of the column as it moves downwardly, leaving the central part of the packing bed relatively dry and unused, which reduces the operational efficiency. To prevent this, redistributors have been located at selected points along a packing bed, particularly where the bed is of extensive length, which distribute the liquid uniformly for the following packing elements, and thereby reduce the tendency to develop wall flow.

Since no liquid distribution technique is perfect, there will always be a certain amount of maldistribution of the liquid. This local variation in the mass flow rates of the vapor and liquid results in the development of radial concentration gradients across the column in both liquid as well as the vapor phases. Moreover, assuming a uniformly packed bed, there is little or no driving force for bulk radial flow of vapor, molecular diffusion does act to smooth out vapor phase concentration gradients, but this is only accomplished very slowly.

There are many instances where it is necessary to introduce feed streams into the middle of a packed column or it may be requisite to support very long beds, and in either case intermediate bed supports, similar to the bed support 16, are necessary. Immediately following such bed supports, it is highly advisable to provide for redistribution of the liquid.

It is fundamental to an understanding of the present invention to note that where such liquid redistribution is considered necessary or advisable, it must provide for the distribution of both the downflowing liquid, as well as the upflowing vapor in order to obtain optimum benefit. No known prior art packing column accomplishes this double form of redistribution.

Accordingly, it is assumed that the column 13 is of such length as to have a relatively long packing bed requiring an intermediate support 20 and below which a redistributor is located identified generally as 21 constructed and operating in a manner to be described.

A preferred form of apparatus for accomplishing the method of this invention is depicted generally in FIG. 2 and identified as 22. It is seen to include a base plate 30 having an upstanding peripheral wall 31 extending completely about the base plate. A plurality of openings 32 are formed in the base plate 30 and arranged to provide a substantially uniform concentration throughout the plate. These openings 32, which will be referred to hereinafter as drip points, provide a means for the liquid deposited thereon to be uniformly distributed from the lower surface of the plate 30 onto the packing bed located below.

A plurality of first vapor risers 33 are located closely adjacent the upstanding wall 31 and relatively equally spaced apart to form an outer circle on the base plate. As can be seen best in FIG. 4, each of the first risers 33 consist of a hollow tubular body 34 having one end open and the opposite end enclosed by a cover 35. Immediately adjacent the cover 35, the sidewall 34 is removed to form a slot 36 which extends substantially 180 degrees about the riser body 34. The risers are located within individual openings 37 in the plate 30 where they are secured by welding, for example, preferably to have a uniform height above the plate. It is an important aspect of the invention that the slots 36 for each of the risers 33 be directed toward the center of the plate 30, which acts to direct all of the vapor passing therethrough toward the central part of the redistributor.

Within the ring of first vapor risers 33 there are provided a plurality of second risers 38 arranged substantially uniformly over the central spatial area of the plate 30. As can be seen best in FIG. 4 on comparison with FIG. 2, each of the risers 38 includes a hollow tubular body 40 with one open end and a second end having a cover disk 41 held in spaced covering relation to the end of tube 40 by a plurality of struts 42. As in the case of the first vapor risers, the tubular body 40 of each second vapor riser is received within an opening 43 in the plate 30 and secured thereto by welding, for example. Preferably, the first and second vapor risers are located so as to extend substantially the same distance above the plate 30. The struts 42 are arranged in spaced apart relation around the axis of the tube 40, holding the cover 40 spaced from the end of the tube and thereby providing substantial open space extending approximately 360 degrees about the tube end. In this way vapor rising through the vapor riser 38 can be emitted from the upper end portion of the vapor riser throughout a substantially 360 degree range with only the struts 42 providing a slight restriction to vapor emission.

The plate of the redistributor 22 is of such geometry and external dimensions as to enable fitting receipt within the column 13, the outer surface of the upstanding edgewall 31 being secured in a suitable manner to the column 13. In use, the downcoming liquid is deposited on the upper surface of the plate 30 from which it drains through the drip points 32 in a substantially uniform manner over the entire plate to be applied in a uniform pattern onto the packing bed elements located below the redistributor. The upstanding wall 31 allows the collection of a certain amount of liquid covering all of the drip points 32 so that uniform passage of liquid therethrough will be achieved.

At the same time that liquid passage and redistribution is achieved, as discussed in the immediately preceding paragraph, vapor moves upwardly through the first and second vapor risers providing streams of vapor from the first vapor risers 33 directed toward the center of the plate 30 and 60 degree vapor streams from the second vapor risers, producing vapor streams which collide and thoroughly mix with one another before moving upwardly through the packing bed immediately above. In particular, this countermovement from the outer vapor risers toward the center and the more centrally located vapor risers toward the outer edge serves to smooth out any concentration gradients that may exist in the vapor so that the vapor moving upwardly into the packing bed will be of more relatively uniform concentration.

I claim:

1. Redistribution apparatus for reducing liquid to vapor concentration gradients in a packed column within which liquid and vapor counterflow, comprising:

a base plate interconnected to the column at a predetermined location therealong, said base plate having a plurality of drip point openings therein arranged in a substantially uniform density over the plate and which openings are the sole means by which liquid collected on the base plate can pass downwardly to the remainder of the column;

a plurality of first vapor risers mounted on said base plate closely adjacent the base plate outer edge and arranged in a closed path, said first vapor risers emitting vapor generaly parallel to the plate and directly solely inwardly of the closed path; and a plurality of second vapor risers mounted on the base plate inwardly of the closed path, said second vapor risers emitting vapor generally parallel to the base plate and over substantially 360 degrees.

* * * * *

Dedication 4,820,455.—*John G. Kunesh*, Burbank, Calif.; *Frederik J. Zuiderweg*, Bussum, Netherlands. APPARATUS FOR REDISTRIBUTION OF VAPOR AND LIQUID IN A PACKED COLUMN. Patent dated Apr. 11, 1989. Dedication filed June 19, 1989, by the assignee, Fractionation Research, Inc.

Hereby dedicates to the Public the entire term of said patent.
[ *Official Gazette September* 12, 1989 ]